United States Patent Office 3,531,932
Patented Oct. 6, 1970

3,531,932
ROTARY PISTON INTERNAL COMBUSTION ENGINE OF THE TROCHOIDAL TYPE
Walter Froede, Neckarsulm, Wurttemberg, Germany, assignor to NSU Motorenwerke Aktiengesellschaft, Neckarsulm, Germany, and Wankel G.m.b.H. Lindau, Bodensee, Germany
Filed Apr. 12, 1968, Ser. No. 720,904
Claims priority, application Germany, Apr. 15, 1967,
N 30,360
Int. Cl. F02b *53/00;* F01n *3/14*
U.S. Cl. 60—30     5 Claims

ABSTRACT OF THE DISCLOSURE

This invention relates to a rotary piston internal combustion engine of the trochoidal type comprising an outer body with a pair of end walls interconnected with a peripheral wall having an inner surface of multi-lobed profile, a multi-apex rotor eccentrically supported for rotation within said outer body and sliding with its apexes along said inner surface for defining a plurality of working chambers between the outer body and rotor which vary in volume during relative rotation of the rotor and outer body, and further comprising intake and exhaust ports in the peripheral wall and/or in the end walls for introducing fresh charge into the working chambers and for expelling burned gases, respectively, which intake and exhaust ports are controlled by the rotor and communicate with the intake and exhaust passages. A pre-exhaust port is arranged in the outer body before the exhaust port in the direction of rotation of the rotor and a pre-exhaust passage extends from the pre-exhaust port and opens into the exhaust passage.

BACKGROUND OF THE INVENTION

It is known that air pollution by unburnt components in the exhaust gases of internal combustion engines can be diminished by adding air to the exhaust gases within the exhaust passage. Furthermore, it is known that high temperatures in the exhaust passage obstruct or diminish the formation of noxious constituents in the exhaust gases.

SUMMARY OF THE INVENTION

It is the object of the invention to obtain with simple means a decontamination of the exhaust gases in rotary piston internal combustion engines of the trochoidal type. With this and other objects in mind the invention proposes to provide in the peripheral wall and/or in the end walls of the outer body a pre-exhaust port before the exhaust port with respect to the direction of rotation of the rotor, which pre-exhaust port communicates with a pre-exhaust passage that opens into the exhaust port. The gases in the respective working chambers have a considerably higher temperature at the moment in which the pre-exhaust port is opened than at the moment in which the normal exhaust port is opened. Therefore, the combustion gases passing through the pre-exhaust passage into the exhaust passage heat up the exhaust passage to such an extent that the exhaust gases which thereafer pass through the exhaust port into the exhaust passage are decomposed and the formation of noxious constituents is prevented.

The exhaust port may be surrounded by an annular chamber which is connected on one hand with the pre-exhaust passage and, on the other hand, by a plurality of openings with the interior of the exhaust passage which results in an improved heating-up of the exhaust passage and of the exhaust gases streaming therethrough. Furthermore, the exhaust passage may be heat-isolated especially in that region where it passes through the outer body. This isolation can be effected by an air gap between the exhaust passage and the outer body. Furthermore, the heating-up of the exhaust gases entering the exhaust passage can be improved by providing within the exhaust passage near the exhaust port a piece of sheet metal which is heat-isolated against the wall of the exhaust passage and which is heated to a glowing temperature by the combustion gases.

These means for heating-up the exhaust passage and the exhaust gases passing therethrough can be combined with means for obtaining an after-burning. For this purpose a passage for the supply of air may open into the exhaust passage and/or in the pre-exhaust passage. Also in this case the exhaust passage or the pre-exhaust passage may be surrounded by an annular chamber which on one hand is connected to the air passage and which, on the other hand, is in communication with the interior of the exhaust passage or the pre-exhaust passage by a plurality of openings.

The air for after-burning may be provided by a separate pump or blower. However, instead thereof a rotary piston internal combusion engine of the trochoidal type may be used having a peripheral wall with a three-lobed inner surface and with a rotor with four apex portions whereby one lobe of the outer body is provided with a suction port and a delivery port for the air. Such an engine is described in our U.S. Pat. No. 2,988,065. In said known engine the air is used only for internal cooling of the engine. By connecting the delivery port by a pipe to the exhaust passage or to the pre-exhaust passage, the air can in addition be used for after-burning of the exhaust gases.

BRIEF DESCRIPTION OF THE DRAWING

Other objects and advantages will become apparent from the following detailed description with reference to the drawing showing several preferred embodiments of the invention and in which.

DESCRIPTION OF THE PREFERRED EMBODIMENTS

Figure 1:
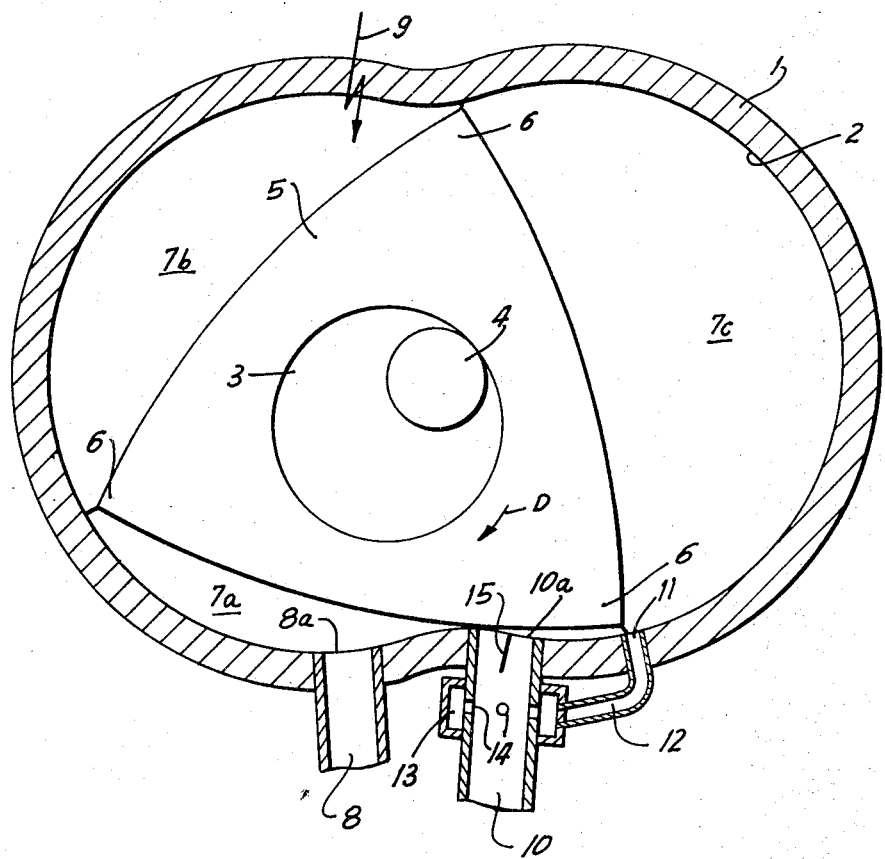
FIG. 1 is an axial sectional view embodying one form of the invention.

Referring to FIG. 1, there is shown a rotary piston internal combustion engine having an outer body comprised of a pair of end walls (not shown) interconnected with a peripheral wall 1. The profile of the inner surface 2 of the peripheral wall 1 is basically a two-lobed epitrochoide. A shaft 4 having an eccentric portion 3 is supported in the outer body end walls by suitable bearings (not shown). A rotor 5 is supported on the eccentric portion 3 for rotation relative to said shaft and its eccentric portion. The rotor 5 is provided with three apex portions 6 capable of sliding along the inner surface 2 of the peripheral wall 1 during rotation of the rotor. Thereby three variable volume working chambers 7a, 7b and 7c are formed between the inner surface 2 of the peripheral wall 1 and the outer peripheral surface of the rotor 5. An intake passage 8 for fresh gases, a spark plug 9 symbolically shown as lightning, and an exhaust passage 10 are provided in peripheral wall 1. The ports 8a and 10a of passages 8 and 10 are controlled by the apex portions 6 of rotor 5. During rotation of the rotor 5 each working chamber 7a, 7b and 7c undergoes the four phases of intake, compression, expansion and exhaust. In the position of the rotor 5 shown in FIG. 1, the working chamber 7a is commencing its intake phase, the working chamber 7b is in its compression phase and the working chamber 7c is near the end of its expansion phase.

A pre-exhaust port 11 is arranged in the peripheral wall 1 before said exhaust port 10a as seen in the direction of rotation D of the rotor 5. This pre-exhaust port 11 is connected by a pre-exhaust passage 12 to an annular chamber 13 which surrounds the exhaust passage 10 and which is in communication with the interior of exhaust passage 10 by openings 14. In the position of FIG. 1, the rotor 5 has just opened the pre-exhaust port 11 towards working chamber 7c so that combustion gases which have not yet completely expanded and which, therefore, have a large heat capacity can pass through passage 12, annular chamber 13 and openings 14 into the exhaust passage 10. Under these circumstances, the exhaust passage 10 is heated to such an extent that the formation of noxious components is prevented in the exhaust gases which after further rotation of rotor 5 pass through the exhaust port 10a into the exhaust passage 10. In addition, heating-up of these exhaust gases can be promoted by arranging within the exhaust passage 10 and close to the exhaust port 10a an exposed glowing insert in form of sheet metal 15 which is heat-isolated against the wall of the exhaust passage 10.

In order to obtain after-burning of the exhaust gases, air is preferably delivered into the exhaust passage. In the embodiment of FIG. 1, this air can be delivered to either or both of passages 10 and 12 through a pipe (not shown in the drawings).

Figure 2:
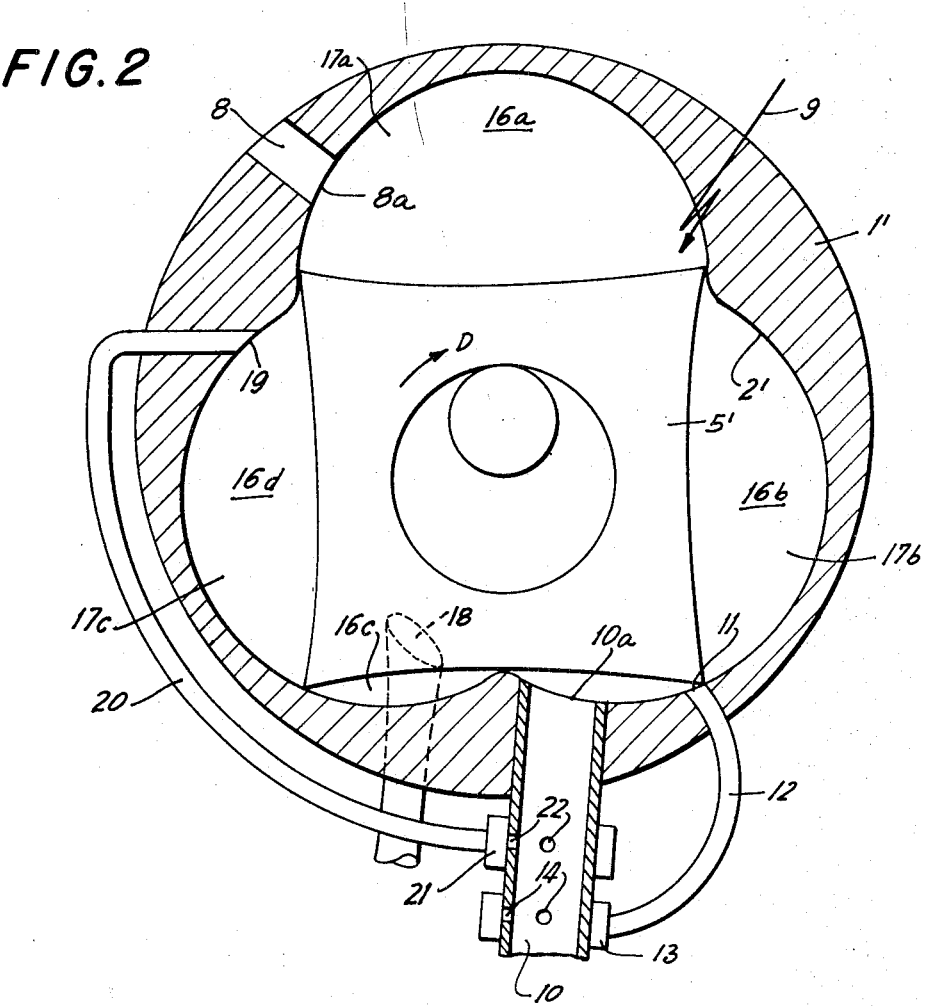
FIG. 2 is an axial sectional view showing another form of the invention.
Figure 3:
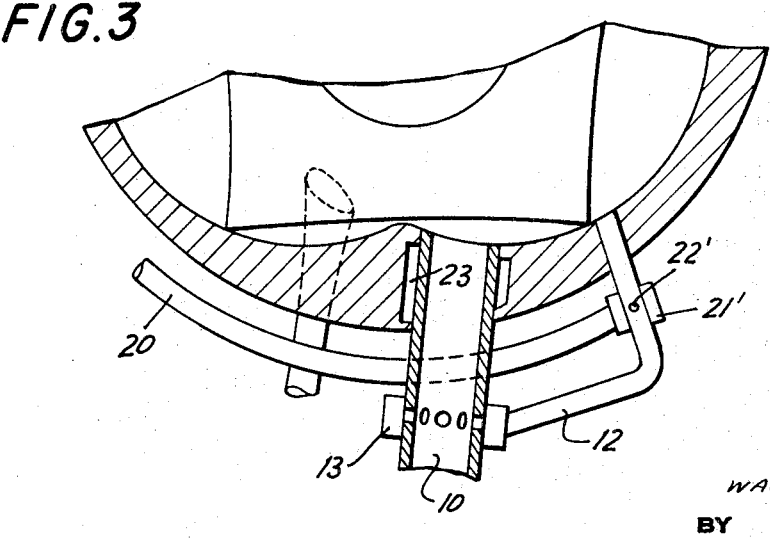
FIG. 3 is a partial view similar to that one shown in FIG. 2 showing a third embodiment of the invention.

In order to dispense with a separate air delivery mechanism, there is shown in FIGS. 2 and 3 a rotary piston internal combustion engine of the trochoidal type having an outer body with a peripheral wall 1', the inner surface 2' of which has a profile in the form of a three-lobed epitrochoid. The rotor 5' of this engine has four apex portions which slide along the inner surface 2' whereby four variable working chambers 16a, 16b, 16c and 16d are formed between the inner surface 2' and the outer peripheral wall of rotor 5'. The lobes of the internal cavity of the outer body formed by the inner surface 2' are designated 17a, 17b and 17c. The intake port 8a is arranged in lobe 17a and the exhaust port 10a is arranged in lobe 17b. The lobe 17c is provided in its leading portion relative to the direction of rotation D of rotor 5' with a suction port 18 and in its trailing portion with a delivery port 19 for air.

During rotation of rotor 5' in the direction of arrow D, each working chamber undergoes a cycle which comprises the normal four phases of intake, compression, expansion and exhaust and following this, a suction phase and a delivery phase for air. Working chamber 16a undergoes its intake phase. Working chamber 16b is near the end of its expansion phase. Working chamber 16c is at the end of its exhaust phase and comes in communication with suction port 18 after further rotation of rotor 5'. Working chamber 16d is in communication with delivery port 19 whereby on further rotation of rotor 5' the air which has previously been sucked into working chamber 16d is delivered through delivery pipe 20 into an annular chamber 21 which surrounds the exhaust passage 10 and which communicates with its interior through openings 22. As with the embodiment of FIG. 1, the exhaust passage 10 is surrounded by a further annular chamber 13 which communicates with the interior of passage 10 through openings 14 and which is connected to the pre-exhaust port 11 by passage 12.

In the position of rotor 5' shown in FIG. 2, air is delivered through delivery pipe 20 and simultaneously hot combustion gases are delivered through pre-exhaust passage 12 into the exhaust passage 10. Thereby an after-burning of the exhaust gases passing through exhaust port 10a is obtained at elevated temperature so that formation of noxious constituents is prevented or at least reduced.

The embodiment of FIG. 3 corresponds to the embodiment of FIG. 2 with the difference that the air delivery pipe 20 does not open into the exhaust passage 10 but into the pre-exhaust passage 12. In this case, the pre-exhaust passage 12 is surrounded by an annular chamber 21' which communicates with the interior of the pre-exhaust passage 12 through openings 22'. Accordingly, a very effective after-burning at low engine loads is obtained. In this embodiment, the exhaust passage 10 is heat-isolated against the adjacent portion of peripheral wall 1' by a closed annular air gap 23 so that heat transfer to the peripheral wall 1' is diminished.

In the embodiments shown in the drawings, the ports 8a, 11 and 19 are arranged in the respective inner surface 2 and 2' of the peripheral wall 1 and 1', respectively. However, it is also possible to arrange these ports in one or both end walls of the outer body. The port 18 in FIG. 2 could also be arranged in the inner surface 2' although the arangement shown in the drawings is preferred as this arrangement prevents overlap between the exhaust phase of the burned gases and the suction phase for the air.

I claim:

1. A rotary piston internal combustion engine of the trochoidal type comprising an outer body having a peripheral wall with an inner surface of multi-lobed profile and end walls, a shaft supported for rotation in said outer body and having an eccentric portion thereon, a rotor supported for relative rotation in a certain direction on said eccentric portion, said rotor having apex portions which slide along the inner surface of said peripheral wall, whereby a plurality of working chambers is formed between the inner surface of said peripheral wall and the outer peripheral surface of said rotor which vary in volume during relative rotation of said rotor, intake and exhaust ports in certain portions of said walls on the outer body for the intake and exhaust of fresh charge and of burned gases, respectively, which ports are controlled by the rotor, and intake and exhaust passages in communication with said ports, a pre-exhaust port arranged in the outer body before the exhaust port in the direction of rotation of the rotor, and a pre-exhaust passage extending from said pre-exhaust port and opening into the exhaust passage to facilitate the heating of the gases passing through said exhaust port and achieve an afterburner effect, and an insert heated to glowing temperature by the exhaust gases arranged within the exhaust passage close to the exhaust port and being heat-isolated against the wall of the exhaust passage.

2. A rotary piston internal combustion engine as claimed in claim 1 wherein the exhaust passage is surrounded by an annular chamber which communicates with the pre-exhaust passage and which is in communication with the interior of the exhaust passage by a plurality of openings.

3. A rotary piston combustion engine of the trochoidal type comprising an outer body having a peripheral wall with an inner surface of multi-lobed profile and end walls, a shaft supported for rotation in said outer body and having an eccentric portion thereon, a rotor supported for relative rotation in a certain direction on said eccentric portion, said rotor having apex portions which slide along the inner surface of said peripheral wall, whereby a plurality of working chambers is formed between the inner surface of said peripheral wall and the outer peripheral surface of said rotor which vary in volume during relative rotation of said rotor, intake and exhaust port means in certain portions of said walls of the outer body or the intake and exhaust of fresh charge and burned gases, respectively, which port means are controlled by the rotor, and intake and exhaust passages in communication with said port means, each working chamber performing a cycle which includes the four phases of intake, compression, expansion and exhaust as the rotor rotates, said exhaust port means comprising a main exhaust port arranged to be opened by the rotor when the working chamber undergoing expansion is at or near its maximum volume, and a pre-exhaust port arranged to be opened by the rotor before the main exhaust port and before that working chamber is at its maximum volume, the cross-sectional area of the pre-exhaust port being smaller than the cross-sectional area of the main exhaust port, a pre-exhaust passage extending from said pre-exhaust port and opening into the main exhaust passage, and a pipe for delivery of air opening in one of said exhaust passages.

4. A rotary piston internal combustion engine according to claim 3, wherein one of said passages is surrounded by an annular chamber which communicates with the air supply pipe and which is in communication with the interior of said one of said passages by a plurality of openings.

5. A rotary piston internal combustion engine according to claim 3, comprising an outer body with a peripheral wall having an inner surface of three-lobed profile and two end walls, a shaft having an eccentric portion and mounted for rotation within the outer body, a rotor having four apex portions mounted on said eccentric portion for relative thereto, said apex portions being capable of sliding along said inner surface whereby four working chambers are formed between said inner surface and the outer peripheral surface of the rotor which working chambers vary in volume during relative rotation of rotor, one of said lobes of said outer body comprising an intake port and another of said lobes comprising an exhaust port and the third of said lobes being provided with a suction port and with a delivery port for air, and the delivery port being connected to one of said passages.

References Cited

UNITED STATES PATENTS

| | | | |
|---|---|---|---|
| 3,103,920 | 9/1963 | Georges. | |
| 3,319,611 | 5/1967 | Terazawa. | |
| 3,386,241 | 6/1968 | Saufferer | 60—30 |
| 3,410,255 | 11/1968 | Winkelmann et al. | 60—29 |
| 3,354,635 | 11/1967 | Guarnaschelli | 60—29 |
| 3,442,257 | 5/1969 | Walker | 123—8 |

FOREIGN PATENTS 1,188,373  1/1962  Germany.

CARLTON R. CROYLE, Primary Examiner

D. HART, Assistant Examiner

U.S. Cl. X.R.

123—8.45